United States Patent [19]

Bauer et al.

[11] Patent Number: 5,063,016

[45] Date of Patent: Nov. 5, 1991

[54] PRODUCTION OF HARDWEARING AND SHOCK-RESISTANT EXTRUDATES OF ULTRA-HIGH MOLECULAR WEIGHT POLYETHYLENE AND APPARATUS FOR THIS PURPOSE

[75] Inventors: Peter Bauer, Ludwighsafen; Rainer Konrad, Goennheim; Herbert Morgenstern, Mannheim; Horst Schuch, Ilvesheim, all of Fed. Rep. of Germany

[73] Assignee: BASF Aktiengesellschaft, Ludwigshafen, Fed. Rep. of Germany

[21] Appl. No.: 520,768

[22] Filed: May 9, 1990

[30] Foreign Application Priority Data

May 12, 1989 [DE] Fed. Rep. of Germany ....... 3915603

[51] Int. Cl.$^5$ ............................................. B29C 47/62
[52] U.S. Cl. ......................... 264/211.21; 264/211.23; 425/208; 425/378.1
[58] Field of Search ........... 264/211.21, 176.1, 211.23; 425/376.1, 378.1, 379.1, 208

[56]   References Cited
U.S. PATENT DOCUMENTS

| 3,026,564 | 3/1962 | Kohlwey | 425/379.1 |
| 3,650,652 | 3/1972 | Dray et al. | 425/376.1 |
| 4,249,877 | 2/1981 | Machen | 425/376.1 |
| 4,518,552 | 5/1985 | Matsuo et al. | 264/126 |
| 4,938,908 | 7/1990 | Shiraki et al. | 425/206 |

FOREIGN PATENT DOCUMENTS

| 2346032 | 3/1975 | Fed. Rep. of Germany | 425/208 |
| 59-133031 | 7/1984 | Japan | 425/376.1 |
| 62-73924 | 4/1987 | Japan | 264/176.1 |

*Primary Examiner*—Jeffery Thurlow
*Attorney, Agent, or Firm*—Keil & Weinkauf

[57] ABSTRACT

For the production of extrudates of ultra-high molecular weight polyethylene, finely divided polyethylene or polyethylene powder is introduced into the cooled feed zone of a single-screw extruder and compressed therein, melted in a transport zone of the extruder and discharge with shaping of the extrudate and cooling. The polyethylene is processed in the transport zone using a velocity gradient of from 50 to 1,000 sec$^{-1}$ in the radial play between the screw and the extruder barrel, heated to 180°–280° C. and then transferred to a screw-free zone in which final shaping of the extrudate is effected.

2 Claims, 1 Drawing Sheet ized. The transport efficiency can be increased by thorough cooling of the grooves, this measure also leading to constant stable transport characteristics,

PRODUCTION OF HARDWEARING AND SHOCK-RESISTANT EXTRUDATES OF ULTRA-HIGH MOLECULAR WEIGHT POLYETHYLENE AND APPARATUS FOR THIS PURPOSE

BACKGROUND OF THE INVENTION

1. Field of the Invention

The present invention relates to a method for producing hardwearing and shock-resistant extrudates of ultra-high molecular weight polyethylene having an intrinsic viscosity of from about 800 to about 3,500 cm$^3$/g and to an apparatus for carrying out this method.

2. Description of the Related Art

EP-A-0 190 878 discloses that ultra-high molecular weight polyethylene (UHMW-pE) can be processed on single-screw extruders. Polyethylene powder is conveyed by means of an extruder screw, melted, and discharged via a die having a length/diameter ratio of $\geq 10$. In order to obtain finished components having the desired properties, the extrudates are taken off and either remain unoriented or are oriented in a ratio of up to 30:1.

The conveying effect of the extruders is generally determined by the ratio of the frictional forces at the barrel to those at the extruder screw. It is true that attempts are made to counteract the resulting limits of the conveying effect by providing the inner wall of the barrel with grooves. However, these lose their effect in practical use as soon as shear stress in the grooves results in the generation of so much heat that the grooves become clogged with fused plastic particles. The result is thermal degradation of the material or a restriction of the extruder throughput to extremely low transport rates. The energy of fusion is preferably introduced via heat conduction, and it is for this reason that only a low level of output can be achieved and only thin extrudates can be produced.

SUMMARY OF THE INVENTION

It is an object of the present invention to produce hardwearing and shock-resistant extrudates on single-screw extruders at high output rates. An additional, special requirement is that there is no molecular weight degradation, which, in the case of ultra-high molecular weight polyethylene, impairs the properties of the extrudates to a particularly great extent.

We have found that this object is achieved, in terms of process engineering, by the measures described in the present invention.

As a result, it is possible to establish stable transport characteristics and high transport efficiency, for example >25%.

The transport characteristics of an extruder screw can be defined in terms of the transport efficiency, regardless of the diameter or speed. The transport efficiency is the ratio of the volume actually conveyed (amount/bulk density/speed) to the volume of a screw channel in the region of the feed zone. Extruder screws usually produce transport efficiencies of up to 25%. This is dependent on the selected pitch, the geometric resistances acting against the screw and the viscosity of the melt. The transport efficiency can be increased by thorough cooling of the grooves, this measure also leading to constant stable transport characteristics, where excessive thermal stress of the material used is avoided.

When this procedure is extrapolated to the extrusion of UHMW-PE, however, it is found that, when the speeds are increased in order to achieve the desired high throughputs, only fissured melt fragments leave the extruder screw. To be able to achieve adequate extrudate quality, the UHMW-PE is subjected to a controlled shearing in the transport zone of the extruder, between the screw and the extruder barrel. Depending on type and throughput of the UHMW-PE to be processed, velocity gradients of from 50 to 1,000 s$^{-1}$ have generally proven the most advantageous.

The polyethylene is heated to 180°–280° C. in the transport zone and then transferred to a screw-free zone in which final shaping of the extrudate is effected. At the end of this zone, in which only minimal shear rates of up to 5 sec$^{-1}$ are applied, the extrudate is cooled to a surface temperature of less than 150° C. The extrudate is further cooled slowly in a separate operation in order to avoid voids. This results in particularly hardwearing and shock-resistant semifinished products.

The present invention furthermore relates to an apparatus for carrying out the method. It consists of a barrel which contains an inlet orifice and an outlet orifice at its ends and in whose cylindrical bore a screw is rotatable, the barrel having a coolable feed zone with grooves extending in the longitudinal direction and a heatable transport zone, and the ratio of the length L to the bore diameter D of the barrel being from about 15 to about 30 and the ratio of the length l to the nominal diameter d of the screw being from about 12 to about 20, so that a screw-free barrel section is formed downstream of the transport zone, the said section being connected to an outlet pipe A and being coolable in the region of the outlet orifice. According to the invention, the screw is double-flighted in the region of the transport zone. The ratio of the length of the outlet pipe to the diameter of the outlet pipe is from about 4 to about 100.

This type of extruder ensures stable transport conditions and the required homogeneity in the melt. The screw is preferably double-flighted over a length of from 7 to 14 d, beginning about 5 d behind the inlet orifice of the extruder barrel. Because of the establishment of comparatively high shear in this region and of low shear in the subsequent screw-free barrel section, extrudates having very good quality and a particularly smooth surface are obtained.

BRIEF DESCRIPTION OF THE DRAWING

The apparatus according to the invention is described below for an embodiment, with reference to the drawing.

DESCRIPTION OF THE PREFERRED EMBODIMENTS

Figure 2:
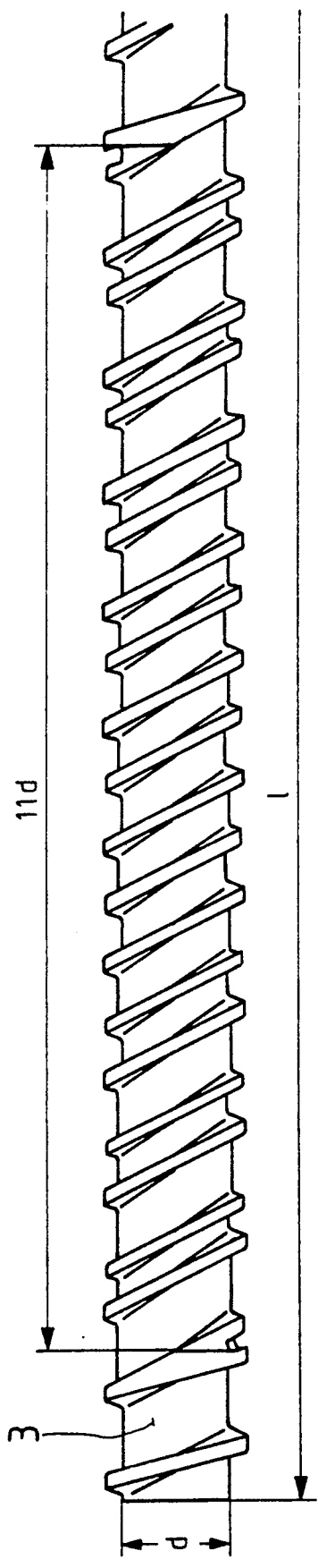
FIG. 2 shows the screw of FIG. 1 in enlarged form.
Figure 1:
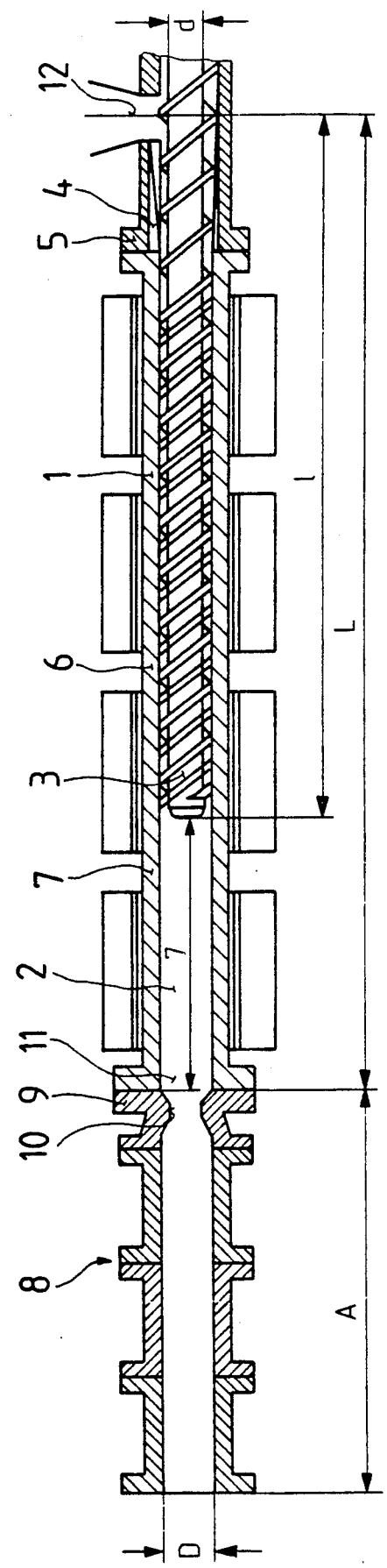
FIG. 1 shows a longitudinal section of a single-screw extruder.

The apparatus essentially consists of a barrel (1) in whose cylindrical bore (2) a screw (3) is rotatable. The barrel is divided into a coolable feed zone (5) having longitudinal grooves (4), a heatable transport zone (6) and a screw-free barrel section (7) connected to the transport zone. The barrel section (7) is connected to a multipart outlet pipe (8). Among the parts of the outlet pipe, the part (9) connected to the outlet orifice (11) has a restricting point (10). (12) denotes the inlet orifice of the barrel.

The ratio of length L to bore diameter D of the barrel (1), without the outlet pipe (8), is about 25, and the ratio of the length l to the nominal diameter d of the screw (3) is about 16. This gives a barrel section (7) without a rotating screw, i.e. the screw (3) is shorter than the barrel (1) and is present only in the feed zone (5) and in the transport zone (6). In the region of the transport zone (6), the screw (3) is double-flighted. In the embodiment shown, the double-flighted screw section is about 11 d.

The diameter of the outlet pipe A corresponds to the diameter of the barrel, the length is 8 times the diameter and the final section of the outlet pipe is coolable.

With a barrel diameter of 60 mm and a screw speed of 80 min$^{-1}$, about 100 kg of satisfactory extrudate are produced. Intrinsic viscosity of the starting material is 2,050 cm$^3$/g and that of the cooled extrudate is 1,970 cm$^3$g.

We claim:

1. A method for producing hardwearing and shock-resistant extrudates of ultra-high molecular weight polyethylene (UHMW-PE) having an intrinsic viscosity of from about 800 to about 3,500 cm$^3$/g, in which finely divided polyethylene or polyethylene powder is introduced into the cooled feed zone of a single-screw extruder and compressed therein, heated to 180°-280° C. in a transport zone of the extruder, transferred to the screw-free zone and discharged with shaping of the extrudate and cooling to a surface temperature of less than 150° C., wherein the polyethylene is processed in the transport zone using a velocity gradient of from 50 to 1,000 sec$^{-1}$ in the radial play between the screw flight and the extruder barrel.

2. Apparatus for producing hardwearing and shock-resistant extrudates of ultra-high molecular weight polyethylene (UHMW-PE) having an intrinsic viscosity of from about 800 to about 3,500 cm$^3$/g, possessing a barrel which contains an inlet orifice and an outlet orifice at its ends and in whose cylindrical bore a screw is rotatable, the barrel having a coolable feed zone with grooves extending in the longitudinal direction and a heatable transport zone, and the ratio of the length L to the bore diameter D of the barrel being from about 15 to about 30 and the ratio of the length l to the nominal diameter d of the screw being from about 12 to about 20, so that a screw-free barrel section is formed downstream of the transport zone, the said section being connected to an outlet pipe A and being coolable in the region of the outlet orifice, wherein the screw is double-flighted in the region of the transport zone, and wherein the ratio of the length of the outlet pipe to the diameter of the outlet pipe is from about 4 to about 100.

* * * * *